(12) United States Patent
Togino et al.

(10) Patent No.: US 8,194,332 B2
(45) Date of Patent: Jun. 5, 2012

(54) FRESNEL OPTICAL ELEMENT AND OPTICAL SYSTEM USING THE SAME

(75) Inventors: Takayoshi Togino, Koganei (JP); Hisashi Ode, Chofu (JP)

(73) Assignee: Olympus Corporation, Toyko (JP)

( * ) Notice: Subject to any disclaimer, the term of this patent is extended or adjusted under 35 U.S.C. 154(b) by 14 days.

(21) Appl. No.: 12/924,582

(22) Filed: Sep. 29, 2010

(65) Prior Publication Data
US 2011/0149418 A1 Jun. 23, 2011

(30) Foreign Application Priority Data

Dec. 17, 2009 (JP) ................. 2009-285932

(51) Int. Cl.
G02B 3/08 (2006.01)
G03B 21/60 (2006.01)

(52) U.S. Cl. ........................... 359/742; 359/457
(58) Field of Classification Search .............. 359/457, 359/741–743; 623/6.25
See application file for complete search history.

(56) References Cited

U.S. PATENT DOCUMENTS
7,535,637 B2 * 5/2009 Ogawa et al. ............ 359/457

FOREIGN PATENT DOCUMENTS
JP 03-209403 9/1991
* cited by examiner

*Primary Examiner* — William Choi
(74) *Attorney, Agent, or Firm* — Kenyon & Kenyon LLP (57) ABSTRACT

A Fresnel optical element has a plurality of slopes that refract or reflect light, and the variation of the slope angle between adjacent slopes is constant.

8 Claims, 11 Drawing Sheets

FRESNEL OPTICAL ELEMENT AND OPTICAL SYSTEM USING THE SAME

BACKGROUND OF THE INVENTION

1. Field of the Invention

The present invention relates to a Fresnel optical element such as a Fresnel lens or Fresnel mirror and an optical system using the Fresnel optical element.

2. Description of the Related Art

A Fresnel optical element serving as a screen that receives irradiation of light beam from a projector for projection of an image near the Fresnel surface and effectively reflects the light beam toward an observer is disclosed in Japanese Patent No. 4,128,599 or Japanese Patent No. 4,149,493. Further, a linear Fresnel mirror with its reflection surface having no power that reflects a projection image almost equivalent to an image obtained when a plane mirror is tilted is disclosed in JP-H03-209403.

SUMMARY OF THE INVENTION

It is preferable that a Fresnel optical element have a plurality of slopes that refract or reflect light and the variation of the slope angle between adjacent slopes be constant.

Further, it is preferable that the plurality of slopes be formed by approximating a rotationally symmetric aspheric surface given by the following definition (a) and satisfy the following conditional expression (1):

$$Z=(Y^2/R)/[1+\{1-(1+k)Y^2/R^2\}^{1/2}]aY^4+bY^6+cY^8+dY^{10}+ \quad (a)$$

$$-1<K<0 \quad (1)$$

where, in a Y-Z plane having the Z-axis of a three-axis right-handed orthogonal coordinate system as the central axis thereof, R is a paraxial radius of curvature, k is a conic constant, and a, b, c, d, . . . are the fourth-, the sixth-, the eighth-, and the tenth-order aspheric coefficients.

Further, it is preferable that the plurality of slopes be formed by approximating a rotationally symmetric aspheric surface given by the following definition (a) and satisfy the following conditional expression (2):

$$Z=(Y^2/R)/[1+\{1-(1+k)Y^2/R^2\}^{1/2}]aY^4+bY^6+cY^8+dY^{10}+ \quad (a)$$

$$-0.5<K<-0.2 \quad (2)$$

where, in a Y-Z plane having the Z-axis of a three-axis right-handed orthogonal coordinate system as the central axis thereof, R is a paraxial radius of curvature, k is a conic constant, and a, b, c, d, . . . are the fourth-, the sixth-, the eighth-, and the tenth-order aspheric coefficients.

Further, it is preferable that the plurality of slopes be formed by approximating a rotationally symmetric aspheric surface given by the following definition (a) and satisfy the following conditional expression (3):

$$Z=(Y^2/R)/[1+\{1-(1+k)Y^2/R^2\}^{1/2}]+aY^4+bY^6+cY^8+dY^{10}+ \quad (a)$$

$$-0.4<K<-0.3 \quad (3)$$

where, in a Y-Z plane having the Z-axis of a three-axis right-handed orthogonal coordinate system as the central axis thereof, R is a paraxial radius of curvature, k is a conic constant, and a, b, c, d, . . . are the fourth-, the sixth-, the eighth-, and the tenth-order aspheric coefficients.

Further, it is preferable that the plurality of slopes be divided into predetermined number of zones and a pitch be changed so that the slope angle in each zone is constant.

Further, it is preferable that the following conditional expression (4) be satisfied $$A>B \quad (4)$$

where A denotes the variation of the slope angle between adjacent slopes, and B denotes the resolving power of the slope angle in a machine forming the slope.

Further, it is preferable that the following conditional expression (5) or conditional expression (6) be satisfied:

$$0.6<A/(n\times B) \quad (5) \text{ or}$$

$$A/(n\times B)<0.4 \quad (6)$$

where A denotes the variation of the slope angle between adjacent slopes, B denotes the resolving power of the slope angle in a machine forming the slope, and n is an integer.

Further, it is preferable that the following conditional expression (7) or conditional expression (8) be satisfied:

$$0.8<A/(n\times B) \quad (7) \text{ or}$$

$$A/(n\times B)<0.2 \quad (8)$$

where A denotes the variation of the slope angle between adjacent slopes, B denotes the resolving power of the slope angle in a machine forming the slope, and n is an integer.

Further, it is preferable that an optical system uses the Fresnel optical element described above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The present invention will be described based on an embodiment and examples.

Figure 1:
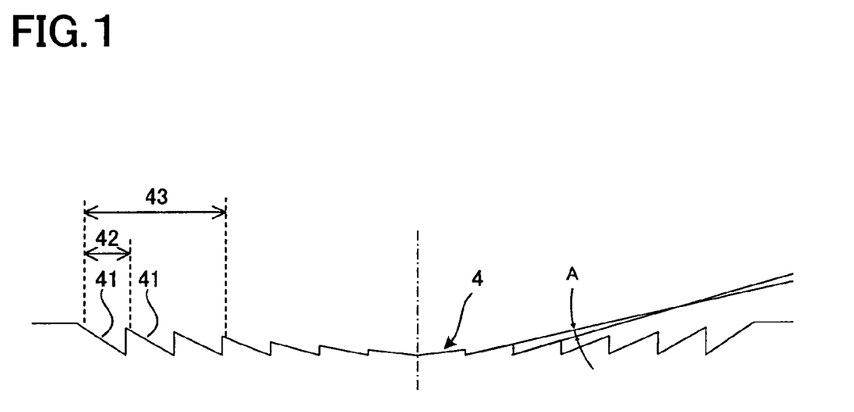
FIG. 1 is a view for explaining a Fresnel optical element.

FIG. 1 illustrates a Fresnel optical element according to an embodiment of the present invention.

It is preferable that a Fresnel optical element 4 according to the present embodiment have a plurality of slopes 41 that refract or reflect light, and a variation A of the slope angle between adjacent slopes 41 be constant.

The Fresnel optical element 4 is an optical element in which the slope of the spherical surface or aspheric surface thereof is approximated with a straight line. This allows a reduction in the thickness of the optical element, so that the Fresnel optical element 4 is suitably used for illumination purpose or in a focusing optical system.

However, when this Fresnel optical element 4 is used as an optical element having a small curvature and a long focal length, the variation between the adjacent pitches becomes small. Then, if the processing accuracy of a processing machine is insufficient, the slope angle becomes discontinuous, which may result in loss of image continuity at the portion where the slope angle is discontinuous.

In view of the above, in the Fresnel optical element 4 according to the present embodiment, a variation A of the slope angle between adjacent slopes 41 is made constant so as to avoid image discontinuity. Therefore, it is possible to provide a high-precision Fresnel optical element having a long focal length that can observe a high-definition image, and an optical system using the Fresnel optical element.

It is preferable that the Fresnel optical element 4 be used as a reflecting ocular optical system that displays in an enlarged manner a high-definition image of 400,000 pixels or more as a remote virtual image.

It is preferable that the following conditional expression be satisfied:

$$0.5 < |d/f|$$

where f is focal length and d is outer diameter.

The above conditional expression indicates that, in the case where a virtual image is formed by a large reflection surface, a large Fresnel area unfavorably increases the number of discontinuous portions.

The light beam diameter is determined depending on the diameter of human pupil, so that even though the pupil diameter of the optical system is large, the light beam diameter is φ4 mm at a maximum and about φ2 mm in a bright image. Thus, in the case where the variation of the slope angle is discontinuous, image continuity may be lost, resulting in a discontinuous observation image.

It is preferable that the following conditional expression be satisfied:

$$0.5 < |f/Ep| < 1.5$$

where f is focal length and Ep is distance between the observer's pupil and reflection mirror.

The above conditional expression indicates a condition for effectively guiding light beam emitted perpendicularly from the display surface of an image to the observer's pupil while ensuring the distance between a reflection mirror and observer's pupil. When the value of |f/Ep| falls below the lower limit, the light beam is obliquely emitted from the display surface, resulting in a dark observation image. In this case, a large mirror is required in order to ensure the same observation view angle. When the value of |f/Ep| exceeds the upper limit, the mirror and the position of the observation's pupil are brought too close to each other, giving an oppressive feeling to the observer.

Further, it is preferable that the plurality of slopes 41 be formed by approximating a rotationally symmetric aspheric surface given by the following definition (a) and satisfy the following conditional expression (1):

$$-1 < K < 0 \qquad (1)$$

where, k is a conic constant

It is important that the plurality of slopes form an elliptical surface with a conic constant of more than −1 and less than 0 wherein the major axis thereof lies along the optical axis and, in this case, the slope angle can be approximated to a constant Fresnel surface in a finite range.

Further, it is preferable that the plurality of slopes 41 be formed by approximating a rotationally symmetric aspheric surface given by the following definition (a) and satisfy the following conditional expression (2):

$$-0.5 < K < -0.2 \qquad (2)$$

where, k is a conic constant of the reflection surface.

When the conditional expression (2) is satisfied, the slope angle can be approximated to a constant Fresnel surface in a wider range.

Further, it is preferable that the plurality of slopes 41 be formed by approximating a rotationally symmetric aspheric surface given by the following definition (a) and satisfy the following conditional expression (3):

$$-0.4 < K < -0.3 \qquad (3)$$

where, k is a conic constant of the reflection surface.

When the conditional expression (3) is satisfied, the slope angle can be approximated to a constant Fresnel surface in a wider range.

It is preferable that the plurality of slopes 41 be divided into predetermined number of zones 43 and a Fresnel pitch 42 be changed so that the slope angle in each zone 43 is constant.

The change in the Fresnel pitch 42 allows the variation of the slope angle to be made constant and image discontinuity to be reduced.

Further, it is preferable that the following conditional expression (4) be satisfied:

$$A > B \qquad (4)$$

where A denotes the variation of the slope angle between adjacent slopes, and B denotes the resolving power of the slope angle in a machine forming the slope.

When the conditional expression (4) is not satisfied, a change in the slope angel becomes discrete by a round-off error, with the result that the smoothness of an image to be observed may be impaired.

Further, it is preferable that the following conditional expression (5) or conditional expression (6) be satisfied:

$$0.6 < A/(n \times B) \qquad (5) \text{ or}$$

$$A/(n \times B) < 0.4 \qquad (6)$$

where A denotes the variation of the slope angle between adjacent slopes, B denotes the resolving power of the slope angle in a machine forming the slope, and n is an integer.

The conditional expression (5) or conditional expression (6) is an expression for specifying the variation of the slope angle and bringing close the angle change to the integral multiple of the resolving power of the slope angle so as to reduce a round-off error. If the conditional expression (5) or conditional expression (6) is not satisfied, a round-off error close to 0.5 is left, with the result that the smoothness of an image to be observed may be impaired.

Further, it is preferable that the following conditional expression (7) or conditional expression (8) be satisfied:

$$0.8 < A/(n \times B) \qquad (7) \text{ or}$$

$$A/(n \times B) < 0.2 \qquad (8)$$

where A denotes the variation of the slope angle between adjacent slopes, B denotes the resolving power of the slope angle in a machine forming the slope, and n is an integer.

Examples of an optical system using a Fresnel optical element according to the present invention will be described below. Constructional parameters of each of the optical systems will be described later.

Figure 2:
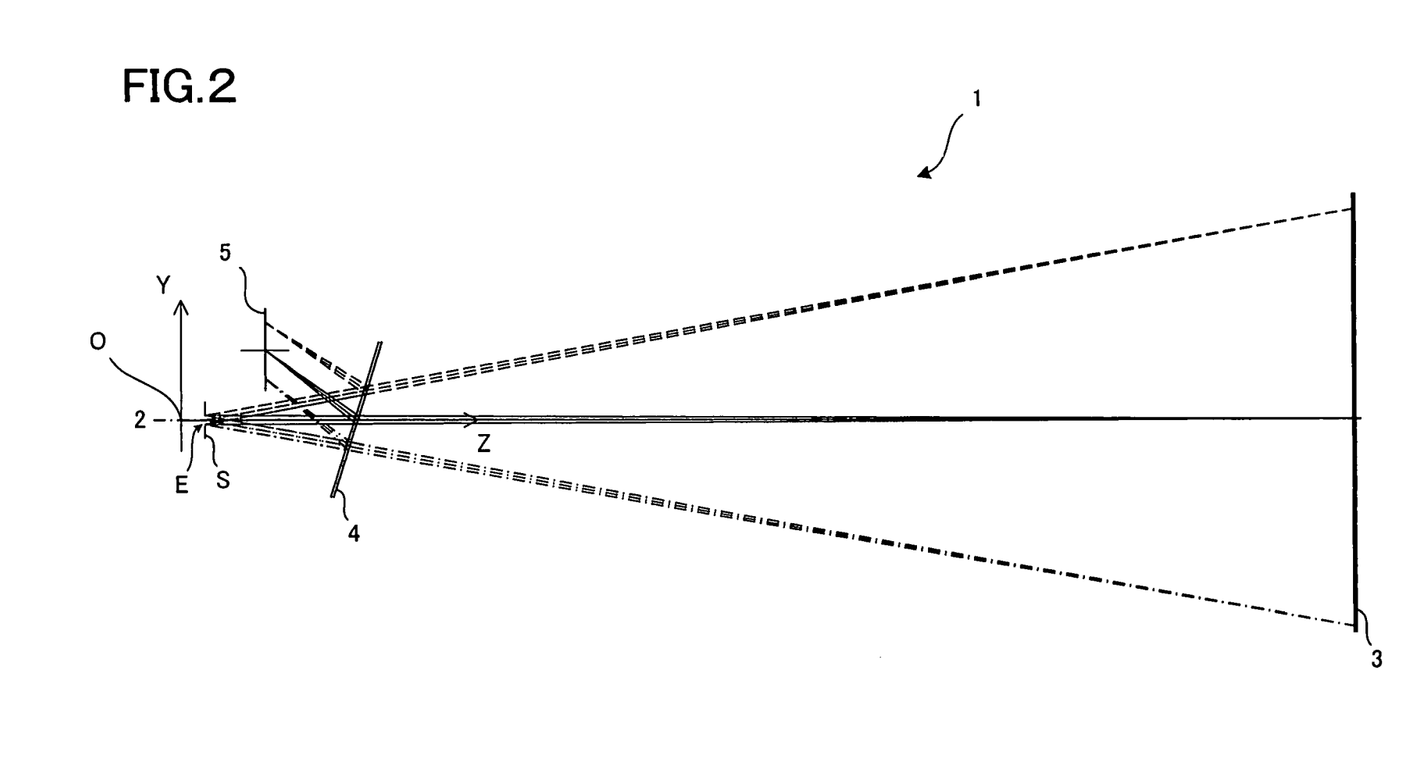
FIG. 2 is a view for explaining the coordinate system of an optical system.

The coordinated system is defined as follows, as illustrated in FIG. 2. That is, an origin O of an optical system 1 is set at the intersection between the central axis of not illustrated projection optical system and a central axis 2 of the optical system 1 along which the central main light beam emitted from an object surface 3 and entering an aperture stop S passes, the direction on the central axis 2 going from the origin O toward the object surface 3 is set as a Z-axis positive direction, and paper surface of FIG. 2 is set as a Y-Z plane. The direction going from the origin O toward an image surface 5 in FIG. 2 is set as a Y-axis positive direction, and the axis constituting a right-handed orthogonal coordinate system with the Y- and Z-axes is set as an X-axis positive direction.

Given for the eccentric surface are the amount of eccentricity of that surface from the origin of the optical system 1 on a coordinate system on which that surface is defined (X, Y and Z are indicative of the X-axis direction, the Y-axis direction, and the Z-axis direction, respectively), and the angles of tilt ($\alpha$, $\beta$, and $\gamma$(°)) of the coordinate systems for defining the surfaces having the X-axis, Y-axis, and Z-axis of a coordinate system defined at the origin O of the optical system 1 as the central axes. In that case, the positive for $\alpha$ and $\beta$ means counterclockwise rotation with respect to the positive directions of the respective axes, and the positive for $\gamma$ means clockwise rotation with respect to the positive direction of the Z-axis. Referring here to how to perform $\alpha$-, $\beta$- and $\gamma$-rotations of the central axis of the surface, the coordinate system that defines each surface is first $\alpha$-rotated counterclockwise about the X-axis of the coordinate system that is defined at the origin of the optical system. Then, the coordinate system is n-rotated counterclockwise about the Y-axis of the rotated new coordinate system. Finally, the coordinate system is $\gamma$-rotated clockwise about the Z-axis of the rotated new another coordinate system.

The width between both eyes of an observer is represented by X eccentricity of the aperture stop S (60 mm width in an optical path diagram of the horizontal cross-section).

When, of optical surfaces forming the optical system of each example, a specific surface and the subsequent surface form together a coaxial optical system, there is a surface spacing given. Besides, the radius of curvature of each surface and the refractive index and Abbe number of the medium are given as usual.

Further, note that the term on which no data are mentioned in the constructional parameters, given later, is zero. Refractive indices and Abbe numbers are given on a d-line (587.56 nm wavelength) basis, and length in mm. The eccentricity of each surface is given in terms of the amount of eccentricity from a reference surface.

The aspheric surface is a rotationally symmetric aspheric surface given by the following definition:

$$Z=(Y^2/R)/[1+\{1-(1+k)Y^2/R^2\}^{1/2}]+aY^4+bY^6+cY^8+dY^{10}+ \quad (a)$$

where Z is the optical axis with the proviso that Y is taken in the direction vertical to the optical axis, R is a paraxial radius of curvature, k is a conic constant, and a, b, c, d, . . . are the fourth-, the sixth-, the eighth-, and the tenth-order aspheric coefficients. The Z-axis in this definition becomes the axis of the rotationally symmetric aspheric surface.

Figure 3:
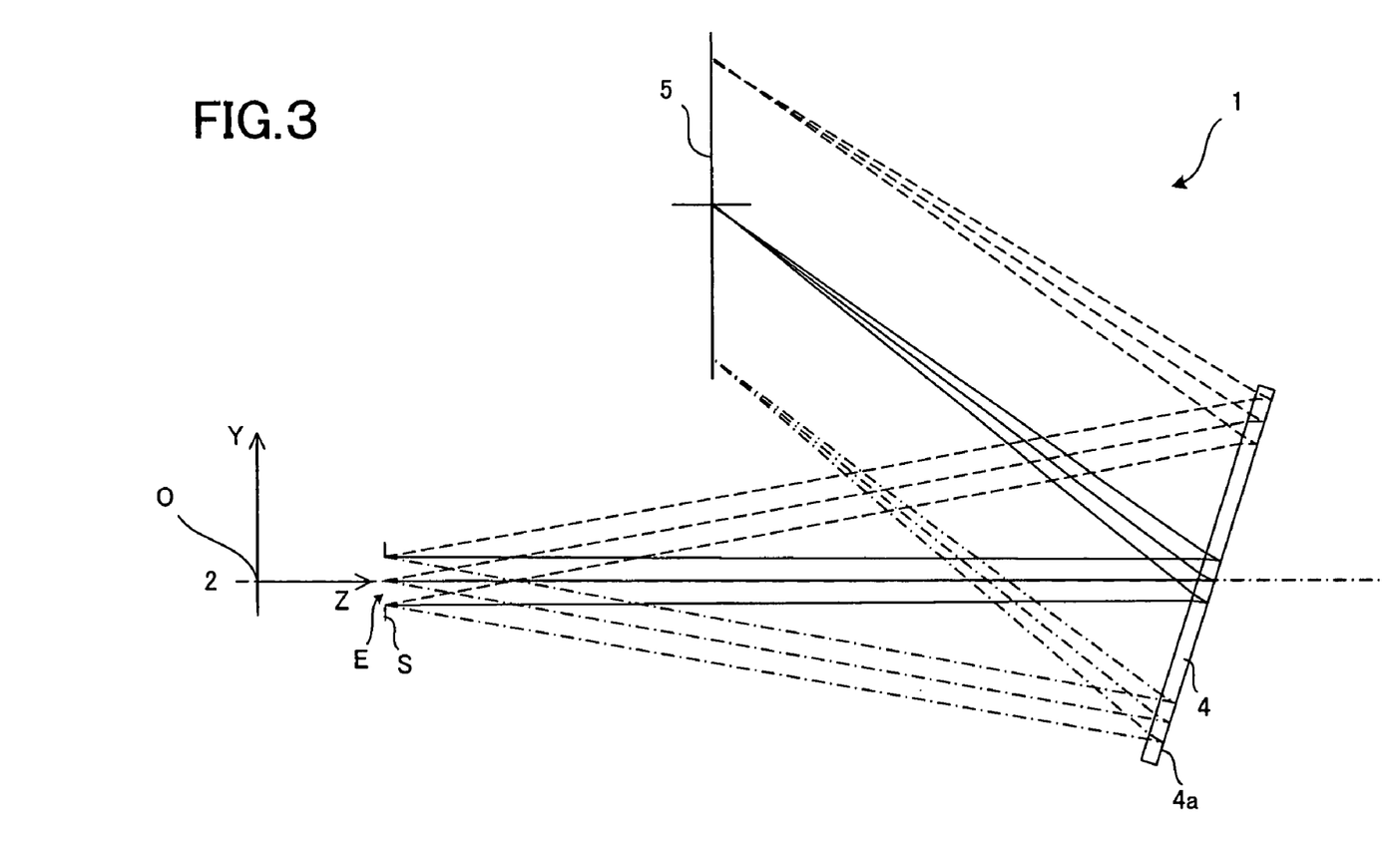
FIG. 3 is a cross-sectional view taken along the central axis of an optical system of Example 1.
Figure 4:
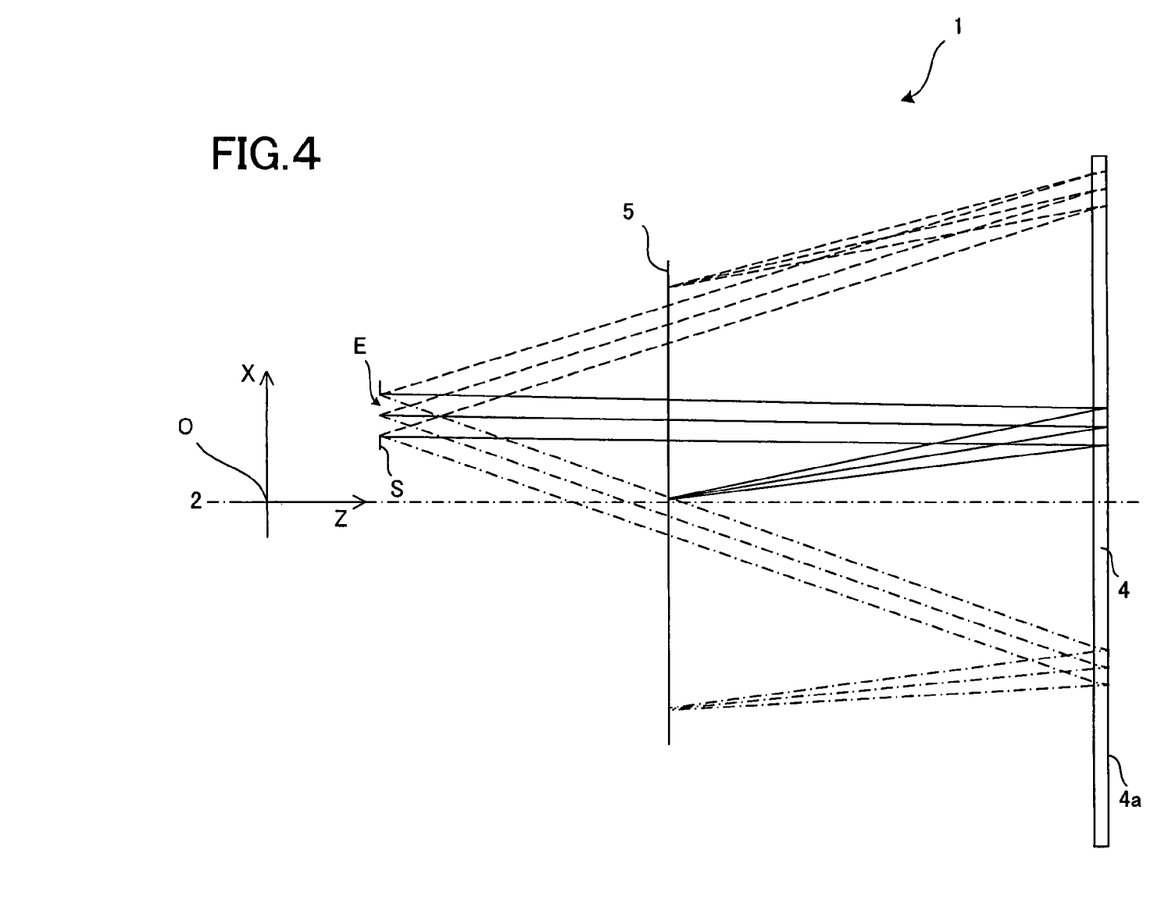
FIG. 4 is a plan view of the optical system of Example 1.

A cross-sectional view taken along the central axis 2 of the optical system 1 of Example 1 is illustrated in FIG. 3, and a plan view of the optical system 1 is illustrated in FIG. 4.

Figure 5:
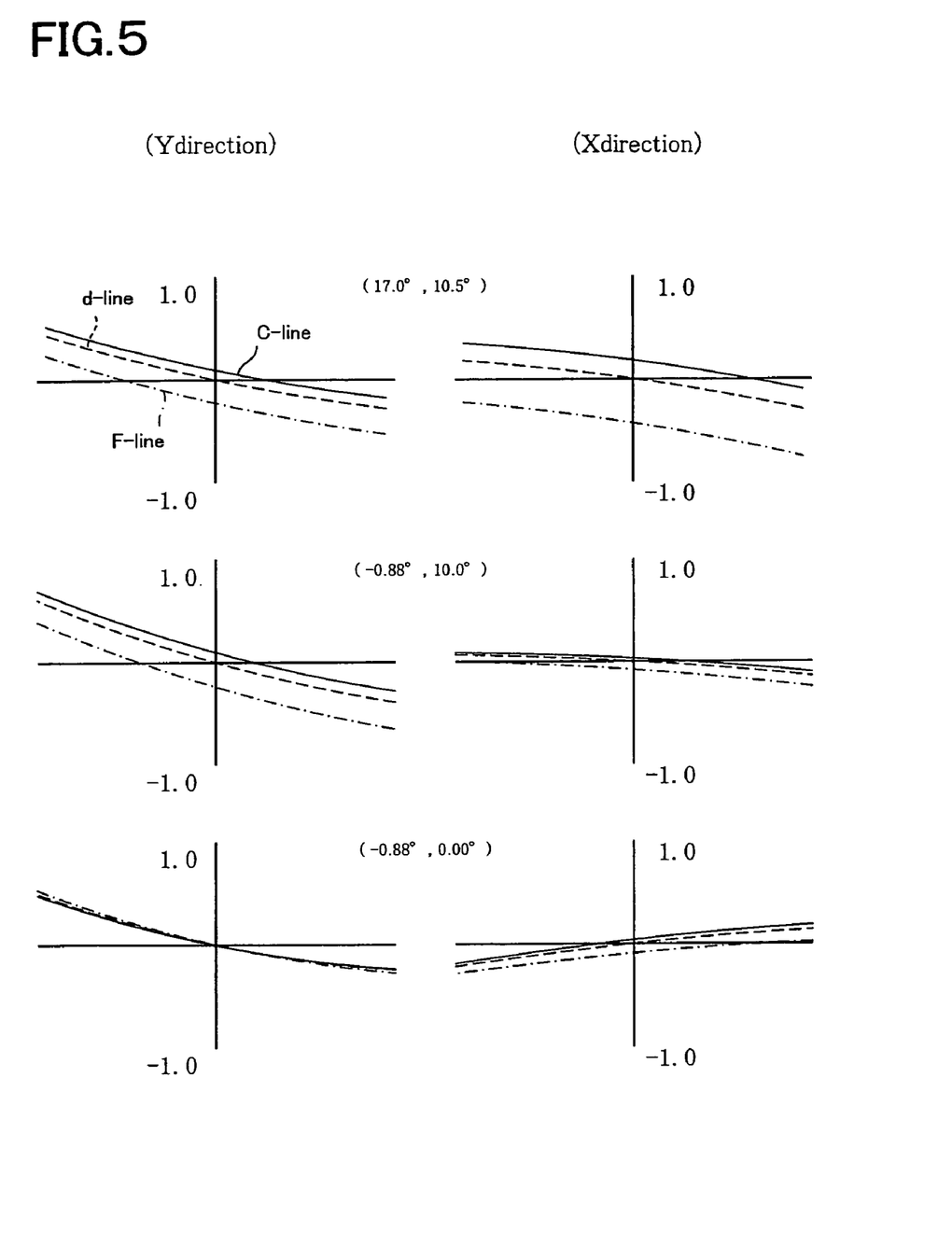
FIG. 5 is a transverse aberration diagram of Example 1.
Figure 6:
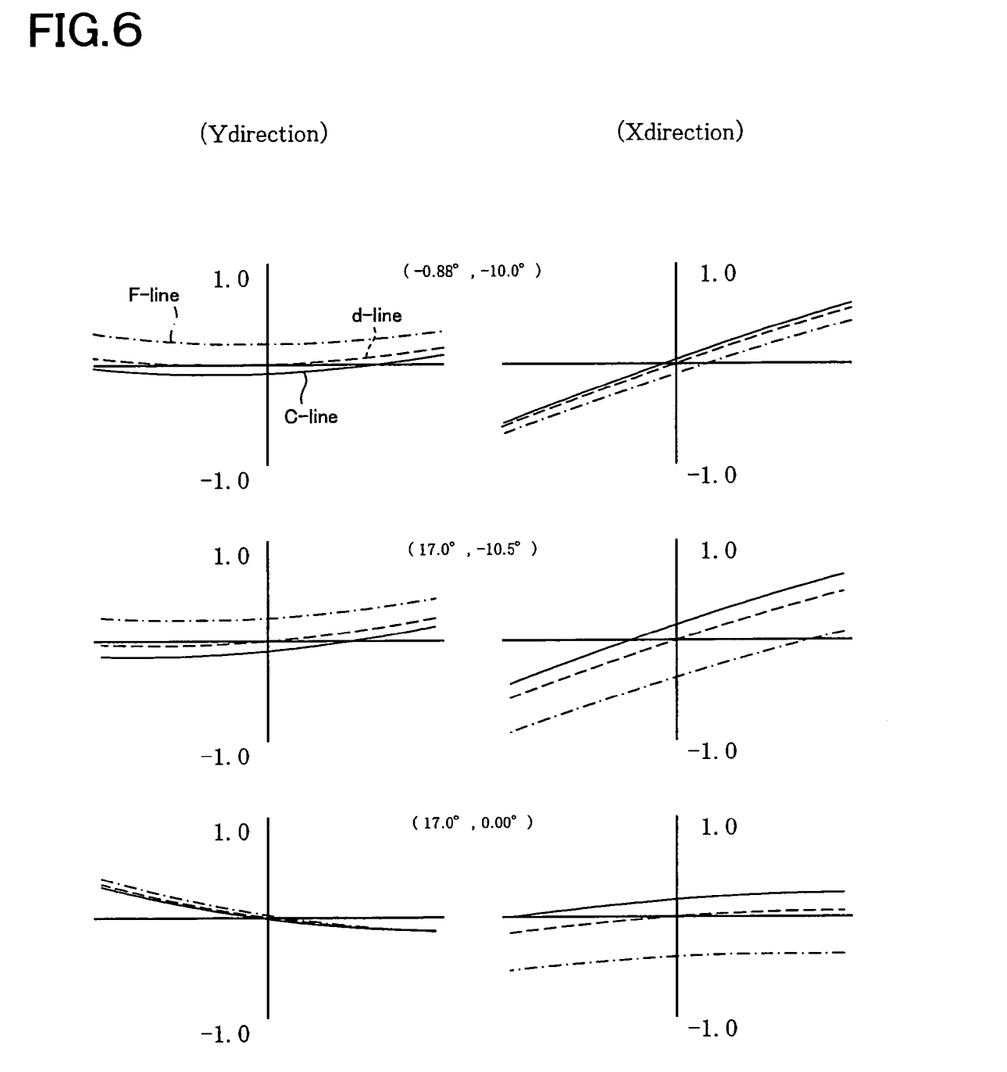
FIG. 6 is a transverse aberration diagram of Example 1.

However, the plan view of FIG. 4 illustrates only the optical path corresponding to one entrance pupil. Further, transverse aberration diagrams of the entire optical system of Example 1 are illustrated in FIGS. 5 and 6. In each transverse aberration diagram, the angles at the center stand for (horizontal angles of view and vertical angles of view), and Y-direction (meridional) and X-direction (sagittal) transverse aberrations at those angles are illustrated.

The optical system 1 includes a not illustrated object surface, a Fresnel optical element 4, and an image surface 5.

The Fresnel optical element 4 includes a Fresnel reflection mirror, and the variation of the slope angle between adjacent slopes is 0.017° in the case where the Fresnel pitch is 0.2 mm.

In the optical system 1, light beam coming from the object surface enters the Fresnel optical element 4 from an eyeball E of an observer as an entrance pupil in the reverse ray trace, reflected by a Fresnel reflection surface 4a, emitted from the Fresnel optical element 4, and enters the image surface 5.

Figure 7:
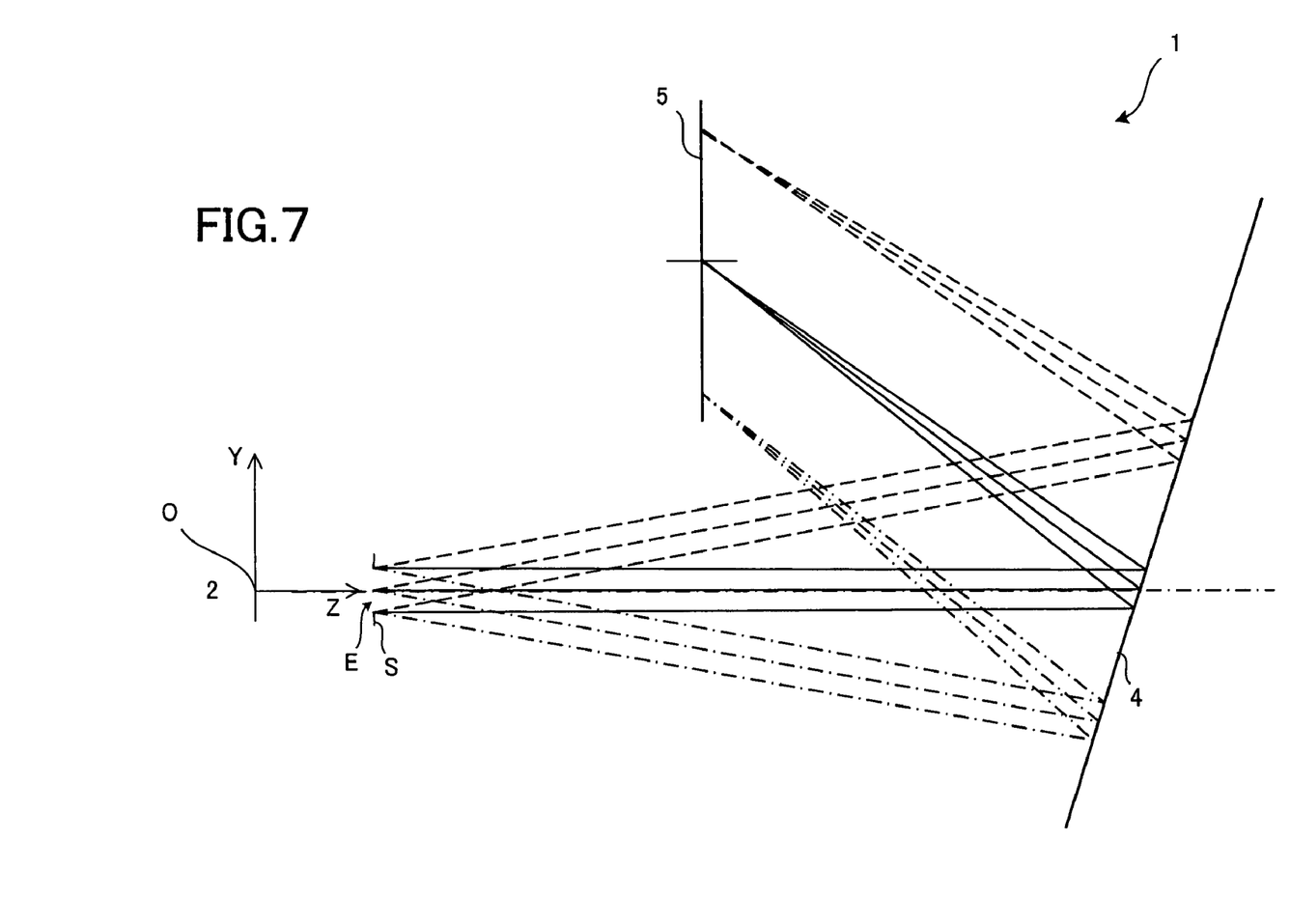
FIG. 7 is a cross-sectional view taken along the central axis of an optical system of Example 2.
Figure 8:
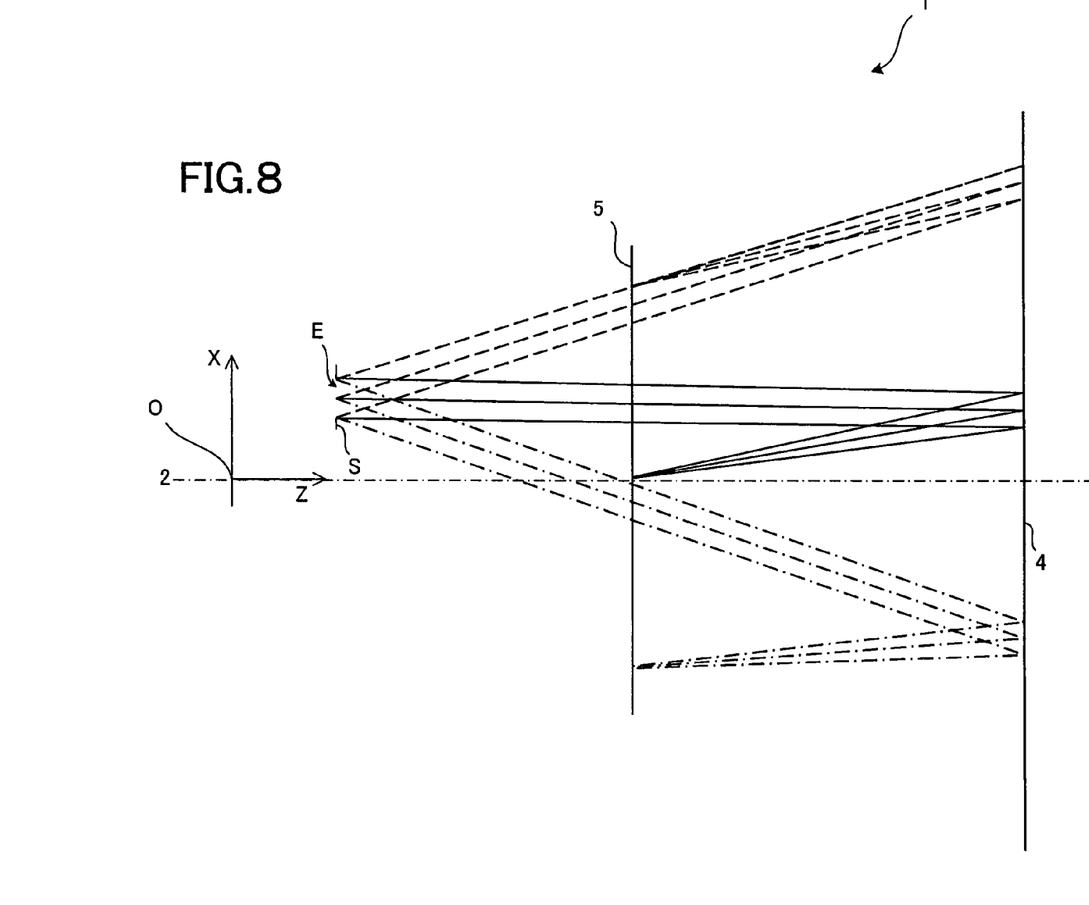
FIG. 8 is a plan view of the optical system of Example 2.
Figure 9:
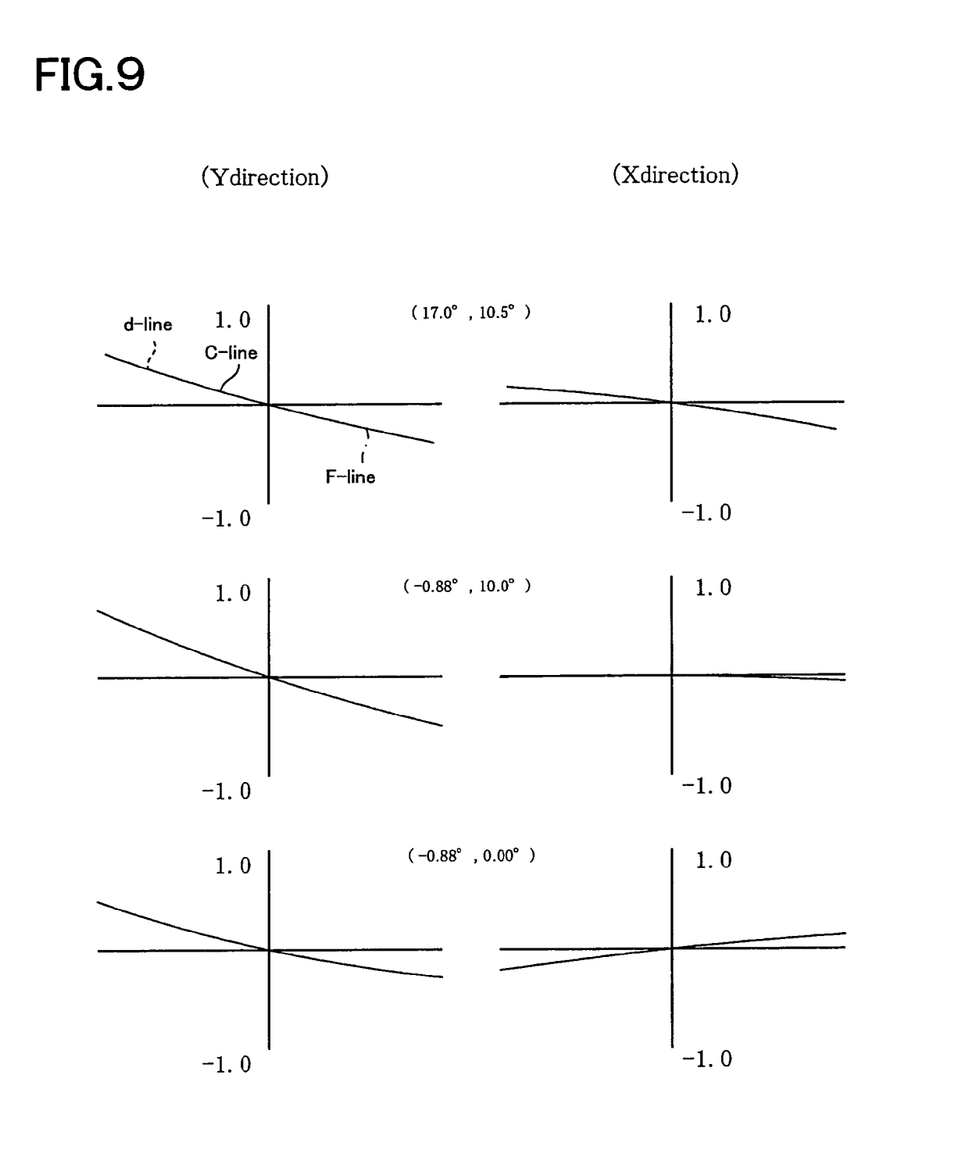
FIG. 9 is a transverse aberration diagram of Example 2.
Figure 10:
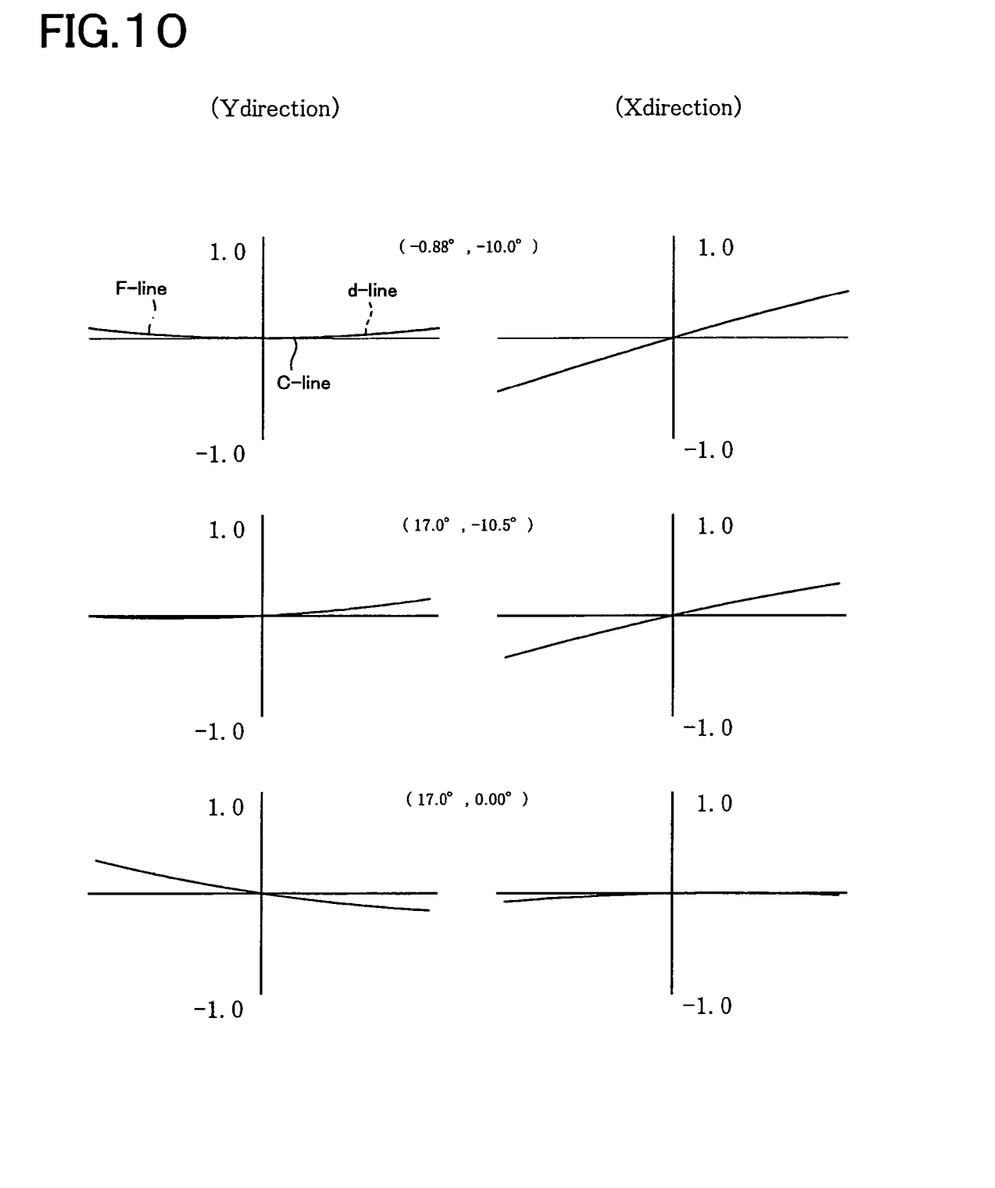
FIG. 10 is a transverse aberration diagram of Example 2.

The specifications of Example 1 are:
Angle of view: horizontally 35° vertically 20°
Entrance pupil diameter (reverse ray trace):
  15.00 mm A cross-sectional view taken along the central axis 2 of the optical system 1 of Example 2 is illustrated in FIG. 7, and a plan view of the optical system 1 is illustrated in FIG. 8. Further, transverse aberration diagrams of the entire optical system of Example 2 are illustrated in FIGS. 9 and 10. However, the plan view of FIG. 8 illustrates only the optical path corresponding to one entrance pupil. In each transverse aberration diagram, the angles at the center stand for (horizontal angles of view and vertical angles of view), and Y-direction (meridional) and X-direction (sagittal) transverse aberrations at those angles are illustrated.

The optical system 1 includes a not illustrated object surface, a Fresnel optical element 4, and an image surface 5.

The Fresnel optical element 4 includes a Fresnel reflection mirror, and the variation of the slope angle between adjacent slopes is 0.02769° in the case where the Fresnel pitch is 0.2 mm.

In the optical system 1, light beam coming from the object surface travels from an eyeball E of an observer as an entrance pupil toward the Fresnel optical element 4 in the reverse ray trace, reflected by the Fresnel optical element 4, and enters the image surface 5.

The specifications of Example 2 are:
Angle of view: horizontally 35° vertically 20°
Entrance pupil diameter (reverse ray trace):
  15.00 mm The constructional parameters in Examples 1 and 2 are illustrated below, wherein the acronym "RE" indicates a reflection surface.

Example 1

| Surface number | Radius of curvature | Plane gap | Eccentricity | Refractive index | Abbe number |
|---|---|---|---|---|---|
| Object | ∞ | −2000.00 | | | |
| 1 | ∞ (Stop) | | 0.00 Eccentricity (1) | | |
| 4 | ∞ | | 0.00 Eccentricity (2) | 1.4918 | 57.4 |
| 5 | Fresnel [1] (RE) | | 0.00 Eccentricity (3) | 1.4918 | 57.4 |
| 6 | ∞ | | 0.00 Eccentricity (2) | | |
| Image plane | ∞ | | Eccentricity (4) | | |

-continued

Fresnel [1]

| | | | | | |
|---|---|---|---|---|---|
| R | | | −674.00 | | |
| k | | | −0.338 | | |

Eccentricity [1]

| X | 30.00 | Y | 0.00 | Z | 40.00 |
|---|---|---|---|---|---|
| α | 0.00 | β | 0.00 | γ | 0.00 |

Eccentricity [2]

| X | 0.00 | Y | 0.00 | Z | 295.00 |
|---|---|---|---|---|---|
| α | −18.02 | β | 0.00 | γ | 0.00 |

Eccentricity [3]

| X | 0.00 | Y | 0.00 | Z | 300 |
|---|---|---|---|---|---|
| α | −18.02 | β | 0.00 | γ | 0.00 |

Eccentricity [4]

| X | 0.00 | Y | 114.28 | Z | 142.92 |
|---|---|---|---|---|---|
| α | 0.00 | β | 0.00 | γ | 0.00 |

Example 2

| Surface number | Radius of curvature | Plane gap | Eccentricity | Refractive index | Abbe number |
|---|---|---|---|---|---|
| Object | ∞ | −2000.00 | | | |
| 1 | ∞ (Stop) | 0.00 | Eccentricity (1) | | |
| 5 | Fresnel [1] (RE) | 0.00 | Eccentricity (2) | | |
| Image plane | ∞ | | Eccentricity (3) | | |

Fresnel [1]

| | |
|---|---|
| R | −413.84 |
| k | −0.345 |

Eccentricity [1]

| X | 30.00 | Y | 0.00 | Z | 40.00 |
|---|---|---|---|---|---|
| α | 0.00 | β | 0.00 | γ | 0.00 |

Eccentricity [2]

| X | 0.00 | Y | 0.00 | Z | 300.00 |
|---|---|---|---|---|---|
| α | 0.00 | β | 0.00 | γ | 0.00 |

Eccentricity [3]

| X | 0.00 | Y | 108.45 | Z | 151.92 |
|---|---|---|---|---|---|
| α | 0.00 | β | 0.00 | γ | 0.00 |

Values of various data in the above Examples are illustrated below.

| Various data | Example 1 | Example 2 |
|---|---|---|
| k | −0.3380 | −0.3450 |
| f | −225.9 | −206.9 |
| d | 262.4 | 264.4 |
| Ep | 260.0 | 260.0 |
| d/f | −1.161 | 1.277 |
| f/Ep | −0.9482 | −0.7958 |

Figure 11:
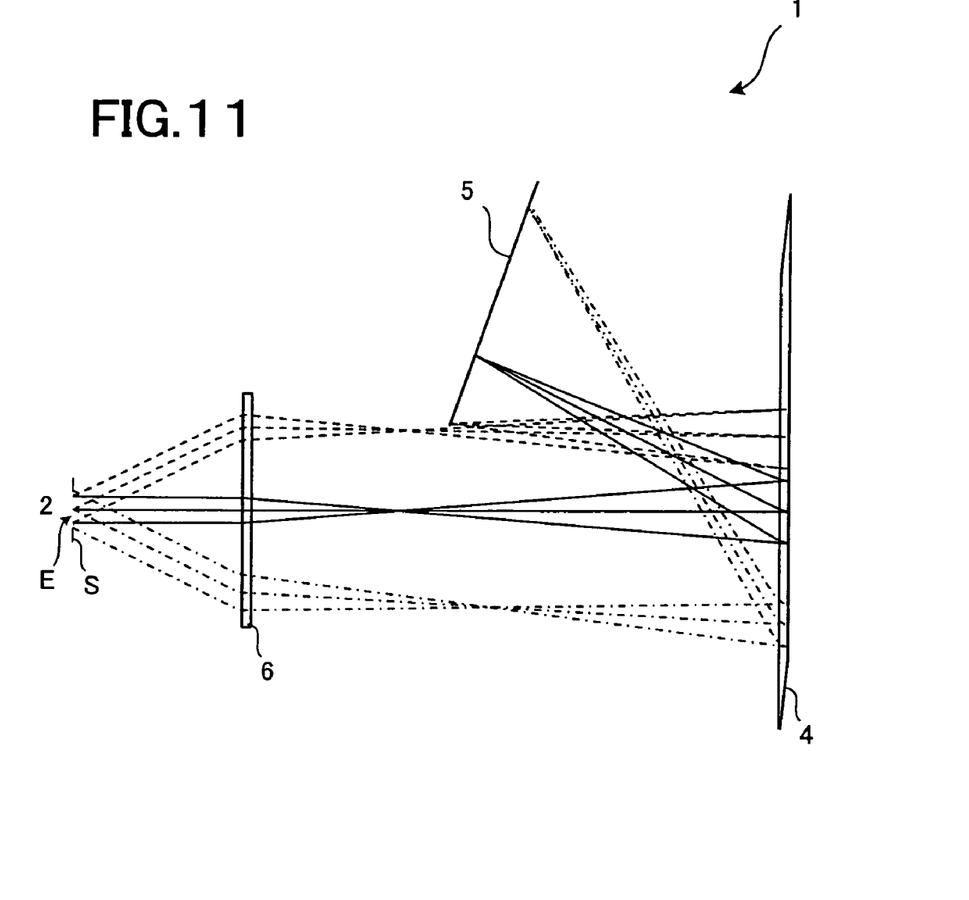
FIG. 11 is a view illustrating another Example of the Fresnel optical element.

Another Example of the Fresnel optical element will be described.

A cross-sectional view taken along the central axis 2 of an optical system 1 using a Fresnel optical element 4 of another Example is illustrated in FIG. 11.

The optical system 1 of another Example includes a not illustrated object surface, a Fresnel optical element 4, and an image surface 5.

In the optical system 1, light beam coming from the object surface travels from an eyeball E of an observer as an entrance pupil toward the Fresnel optical element 4 in the reverse ray trace through a Fresnel lens 6, reflected by the Fresnel optical element 4, and enters the image surface 5.

The Fresnel optical element is vertically asymmetric, and the origin of Fresnel is disposed at a location away from the optical axis by +47.41 mm.

| Specification of Fresnel optical element | |
|---|---|
| pitch | 0.05 mm |
| R | −294.607 mm |
| k | 0.680 |
| a | −5.83170E−07 |
| b | 1.40590E−08 |

In the case where the use range falls between +16.1 mm and −116.0 mm, the Fresnel optical element 4 as illustrated in FIG. 1 is divided into zones 43 as illustrated below, and the variation of the slope 41 is determined for each zone. Then, the pitch 42 is changed based on the determined variation. This allows application to Fresnel having wide effective diameter and small radius of curvature.

| Negative side | | |
|---|---|---|
| Zone | Pitch | Variation |
| 1 | 0~−3.8 [mm] | 0.02° |
| 2 | −3.8~−7.4 [mm] | 0.04° |
| 3 | −7.4~−14.3 [mm] | 0.06° |
| 4 | −14.3~−24.5 [mm] | 0.08° |
| 5 | −24.5~−38.4 [mm] | 0.10° |
| 6 | −38.4~−55.7 [mm] | 0.12° |
| 7 | −55.7~−76.1 [mm] | 0.14° |
| 8 | −76.1~−100.3 [mm] | 0.16° |
| 9 | −100.3~−116.0 [mm] | 0.18° |

| Positive side | | |
|---|---|---|
| Zone | Pitch | Variation |
| 1 | 0~4.2 [mm] | −0.02° |
| 2 | 4.2~9.4 [mm] | −0.04° |
| 3 | 9.4~16.1 [mm] | −0.06° |

It is possible to dispose an image display element at the image surface position of the present embodiment in place of a not illustrated projection optical system. Further, it is possible to display in an enlarged manner an image projected using a projection optical system by means of the Fresnel optical element.

Further, by disposing a diffusion surface having a diffusion property in the vicinity of a projection image (image surface of the present embodiment) projected using the projection optical system, it is possible to reduce the light beam diameter of the projection optical system to thereby reduce a burden on the projection optical system. Further, it is possible to ensure a wide observation area to thereby allow an observer to observe an observation image even if he or she moves in some degree.

Further, it is possible to allow an observer to observe a three-dimensional image by projecting projection images of the two projection optical systems corresponding to left and right eyeballs onto the diffusion surface with the diffusion angle of the diffusion surface controlled so that a cross-talk between the two images is not generated.

Further, a use of a polarization plate and polarization glasses or a time-sharing display technique using liquid crystal shutter glasses allows binocular stereoscopic vision.

Further, by making the Fresnel reflection surface have a semi-transmissive surface, it is possible to allow the optical system 1 to serve as so-called a combiner that displays an exterior image and an electric image in a superimposed manner.

Although it is assumed here that a virtual image surface (object surface in the ray trace) to be observed is located 2 m away from an observer, the distance between the virtual image surface and observer can be set arbitrarily.

What is claimed is:

1. A Fresnel optical element having a plurality of slopes that refract or reflect light, wherein the variation of the slope angle between adjacent slopes is constant; and
wherein the plurality of slopes are formed by approximating a rotationally symmetric aspheric surface given by the following definition (a) and satisfy the following conditional expression (1):

$$Z=(Y^2/R)/[1+\{1-(1+k)Y^2/R^2\}^{1/2}]+aY^4+bY^6+cY^8+dY^{10}+ \quad (a)$$

$$-1<K<0 \quad (1)$$

where, in a Y-Z plane having the Z-axis of a three-axis right-handed orthogonal coordinate system as the central axis thereof, R is a paraxial radius of curvature, K is a conic constant, and a, b, c, and d are the fourth-, the sixth-, the eighth-, and the tenth-order aspheric coefficients.

2. The Fresnel optical element according to claim 1, wherein $$-0.5<K<-0.2.$$

3. The Fresnel optical element according to claim 1, wherein $$-0.4<K<-0.3.$$

4. The Fresnel optical element according to claim 1, wherein the plurality of slopes are divided into predetermined number of zones, and a pitch is changed so that the slope angle in each zone is constant.

5. The Fresnel optical element according to claim 1, wherein the following conditional expression (4) is satisfied:

$$A>B \quad (4)$$

where A denotes the variation of the slope angle between adjacent slopes, and B denotes the resolving power of the slope angle in a machine forming the slope.

6. The Fresnel optical element according to claim 5, wherein the following conditional expression (5) or conditional expression (6) is satisfied:

$$0.6<A/(n\times B) \quad (5) \text{ or}$$

$$A/(n\times B)<0.4 \quad (6)$$

where A denotes the variation of the slope angle between adjacent slopes, B denotes the resolving power of the slope angle in a machine forming the slope, and n is an integer.

7. The Fresnel optical element according to claim 5, wherein the following conditional expression (7) or conditional expression (8) is satisfied:

$$0.8<A/(n\times B) \quad (7) \text{ or}$$

$$A/(n\times B)<0.2 \quad (8)$$

where A denotes the variation of the slope angle between adjacent slopes, B denotes the resolving power of the slope angle in a machine forming the slope, and n is an integer.

8. An optical system using the Fresnel optical element as claimed in claim 1.

* * * * *